United States Patent [19]

Boldebuck et al.

[11] 4,115,341
[45] Sep. 19, 1978

[54] POLYETHERAMIDE-ACID-IMIDE SOLUTION AND PROCESS FOR PREPARATION THEREOF

[75] Inventors: Edith M. Boldebuck, Schenectady; Eugene G. Banucci, Scotia, both of N.Y.

[73] Assignee: General Electric Company, Schenectady, N.Y.

[21] Appl. No.: 761,946

[22] Filed: Jan. 24, 1977

[51] Int. Cl.$^2$ ................................................. C08K 5/06
[52] U.S. Cl. ........................... 260/33.2 R; 260/30.4 N
[58] Field of Search ..................... 260/30.4 R, 33.2 R, 260/47 CP

[56] References Cited

U.S. PATENT DOCUMENTS

| | | | |
|---|---|---|---|
| 3,179,614 | 4/1965 | Edwards | 260/30.4 N |
| 3,542,735 | 11/1970 | Lynch | 260/33.2 R |
| 3,663,728 | 5/1972 | Hoback | 260/33.2 R |
| 3,763,075 | 10/1973 | Grundschober | 260/32.6 NT |
| 3,847,867 | 11/1974 | Heath | 260/47 CP |
| 3,917,643 | 11/1975 | Takekoshi | 260/326 R |

OTHER PUBLICATIONS

Journal of Applied Polymer Science, vol. II, p. 609-627, 1967.

*Primary Examiner*—Paul R. Michl
*Attorney, Agent, or Firm*—Richard G. Jackson; Joseph T. Cohen; Charles T. Watts

[57] ABSTRACT

Disclosed is a solution consisting essentially of a liquid ether solvent and dissolved therein a polyetheramide-acid-imide prepared by reacting at least one aromatic bis(ether anhydride) with at least one organic diamine. Also disclosed is a process for preparing the solution wherein the reaction is carried out in the ether solvent. The solution may be employed as a wire coating enamel.

3 Claims, No Drawings

POLYETHERAMIDE-ACID-IMIDE SOLUTION AND PROCESS FOR PREPARATION THEREOF

The present invention relates to a coating solution containing a polyetheramide-acid-imide polymer and to a process for preparing the solution.

U.S. Pat. No. 3,847,867 (Heath and Wirth) discloses polyamide acid solutions prepared by reacting aromatic bis(ether anhydride)s and organic diamines in dipolar aprotic organic solvents under ambient conditions. The Heath et al. patent also discloses use of the solutions as wire coating enamel. U.S. Pat. No. 3,917,643 (Takekoshi and Kochanowski) discloses a wire coating enamel comprising a solution of polyetheramide in a phenolic solvent (such as phenol or mixtures of o-, p- and m-cresols) and a method of making polyetherimides by reacting aromatic bis(ether anhydrides) and organic diamines in the phenolic solvent at temperatures between about 100° C. to 250° C.

Dine-Hart and Wright describe solution polymerization of pyromellitic dianhydride with aromatic amines in tetrahydrofuran to form polyamic acids (i.e. polyamide acids) which are insoluble in the polymerization solvent, Journal of Applied Polymer Science, 11, 609, 627 (1967).

It has now been found by practice of the present invention that solutions of polyetheramide-acid-imides in particular ether solvents can be prepared. This invention provides improvements over heretofore known polyetheramide-acid-imide coating solutions in that, for example, the ether solvents are generally less expensive and more environmentally acceptable than organic solvents of heretofore known solutions of polyetheramide-acid-imides. Further, imidization of amide-acid groups of polyetheramide acids is generally faster for polyetheramide acids dissolved in ether solvents.

Generally stated, in one aspect of the present invention, there is provided a polyetheramide-acid-imide solution consisting essentially of a liquid ether solvent and dissolved therein a polyetheramide-acid-imide having an imide content no greater than the maximum imide content at which the polyetheramide-acid-imide is soluble in the ether solvent at 20° C. and prepared by reacting at least one aromatic bis(ether anhydride) having the formula

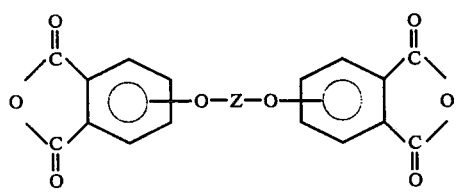
(I)

with at least one organic diamine having the formula

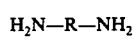
(II)

at a temperature and for a time effective to form the polyetheramide-acid-imide, where Z is a member selected from the class consisting of (A) divalent organic radicals having the following formulas:

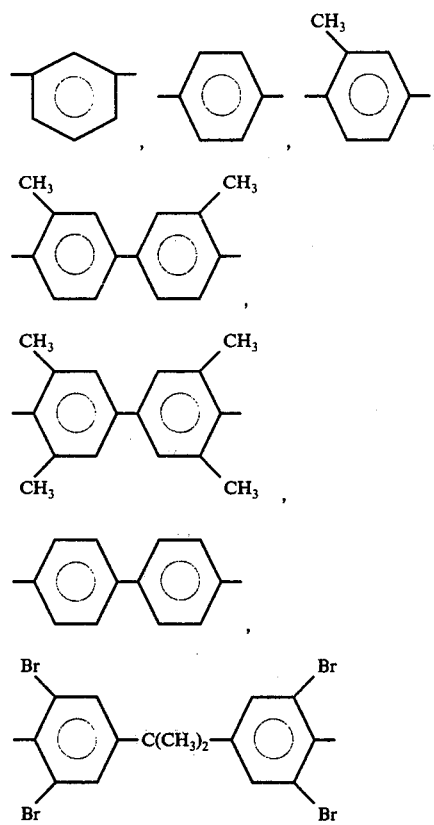

and (B) divalent organic radicals of the general formula

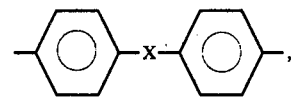

where X is a member selected from the class consisting of divalent radicals of the formulas

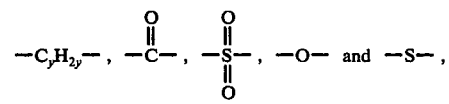

where $y$ is an integer from 1 to 5; and R is a divalent organic radical selected from the class consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, (c) from $C_2$ to about $C_8$ alkylene terminated polydiorganosiloxane, and (d) divalent radicals of the general formula

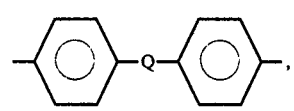

where Q is a member selected from the class consisting of

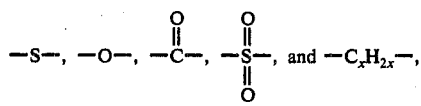

and x is an integer from 1 to 5.

Generally stated, in another aspect of the present invention there is provided a process for preparing a polyetheramide-acid-imide solution, which comprises reacting at least one aromatic bis(ether anhydride) of formula I with at least one organic diamine of formula II in a liquid ether solvent having at least one of said bis(ether anhydride) and said diamine dissolved therein at a temperature and for a time effective to form a solution in the ether solvent of a polyetheramide-acid-imide having an imide content no greater than the maximum imide content at which the polyetheramide-acid-imide is soluble in the ether solvent at 20° C.

As used in this description and in the claims which follow, the term "polyetheramide-acid-imide" includes polyetheramide acids wherein from zero to 100 percent of the amide acid groups are in the imide form.

The polyetheramide-acid-imide consists essentially of from zero to 100 mole percent of recurring units of the formula

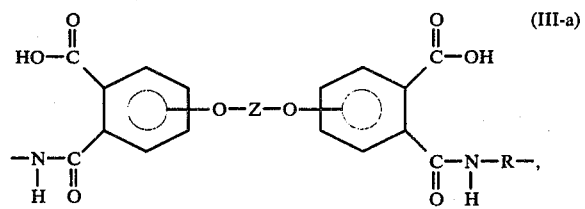

and from 100 to zero mole percent of recurring units selected from the units having the formulas

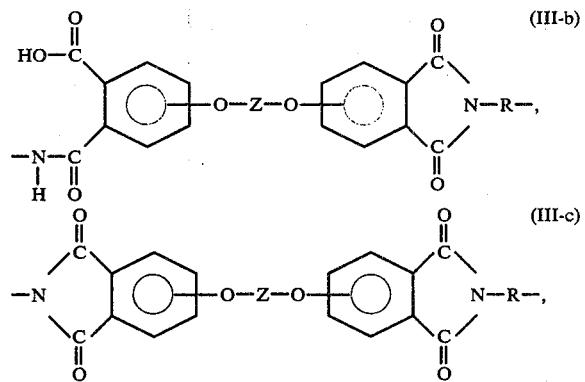

and mixtures of III-b and III-c, the sum of the mole percents being 100 percent, where Z and R are as defined above, subject to the proviso that units of formulas III-b and III-c are not present in such amounts that the polyetheramide-acid-imide is insoluble in the particular ether solvent system at 20° C. The total number of recurring units may be from 2 to 500 and preferably from 100 to 200.

Conveniently, the polyetheramide-acid-imide solution of the present invention may be prepared in situ by the process of this invention. Alternatively, the solution may be prepared by dissolving a preformed polyetheramide-acid-imide in the ether solvent.

Ether solvents useful in the solution and process of this invention include, for example, tetrahydrofuran; 1,4-dioxane; hydroxy ethers having the general formula (IV-a) $R^1\!-\!(O\text{-}CH_2CH_2)\!-\!OH$, 

where $R^1$ is a monovalent radical selected from the group consisting of methyl, ethyl, butyl, phenyl and benzyl; hydroxy ethers having the general formula (IV-b) $R^2\!-\!(O\!-\!CH_2CH_2\!-\!O\!-\!CH_2CH_2)\!-\!OH$ 

where $R^2$ is a monovalent radical selected from the group consisting of methyl, ethyl, butyl, and phenyl; and ethers having the general formula (IV-c) $CH_3\!-\!(O\!-\!CH_2CH_2)_n\!-\!O\!-\!CH_3$ 

where n is an integer from 2 to 4; and mixtures of the foregoing ethers.

The hydroxy ethers of formula IV-a include 2-methoxyethanol (i.e. "methyl cellosolve"), 2-ethoxyethanol, 2-butoxyethanol, 2-phenoxyethanol, and 2-benzyloxyethanol. The hydroxy ethers of formula IV-b include 2-(2-methoxyethoxy)ethanol (i.e. "methyl carbitol"), 2-(2-ethoxyethoxy)ethanol, 2-(2-butoxyethoxy)ethanol, and 2-(2-phenoxyethoxy)ethanol. The ethers of formula IV-c include diethylene glycol dimethyl ether, triethylene glycol dimethyl ether, and tetraethylene glycol dimethyl ether.

The unexpectedness of the discovery that polyetheramide-acid-imides are soluble in the foregoing particular ethers is evidenced by the discovered insolubility of the polyetheramide acid reaction product of equimolar amounts of 2,2-bis[4-(3,4-dicarboxyphenoxy)phenyl]propane dianhydride and methylene dianiline in the following ethers: ethylene glycol dimethyl ether, ethylene glycol butyl ethyl ether, diethylene glycol diethyl ether, diethylene glycol dibutyl ether, and anisole.

The solutions of this invention typically are characterized with good shelf life at ambient temperatures, e.g. 20° to 30° C. If desired, other solvents, e.g. N-methyl pyrrolidone may be included with the ether solvent in minor amounts up to, for example, 10 percent of the weight of ether to aid in precluding imidization at ambient temperature to an extent such that the polyetheramide-acid-imide precipitates from the solution.

The polyetheramide-acid-imide solutions of this invention are useful as wire coating enamels. Desirably, the viscosity of the solutions is from about 200 to 10,000, preferably from about 500 to about 2,500, centistokes at 25° C.

Bis(ether anhydride)s of formula I include, for example, 1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride.

A preferred class of aromatic bis(ether anhydride)s included by formula I includes compounds of formulas V to VII, which follow:

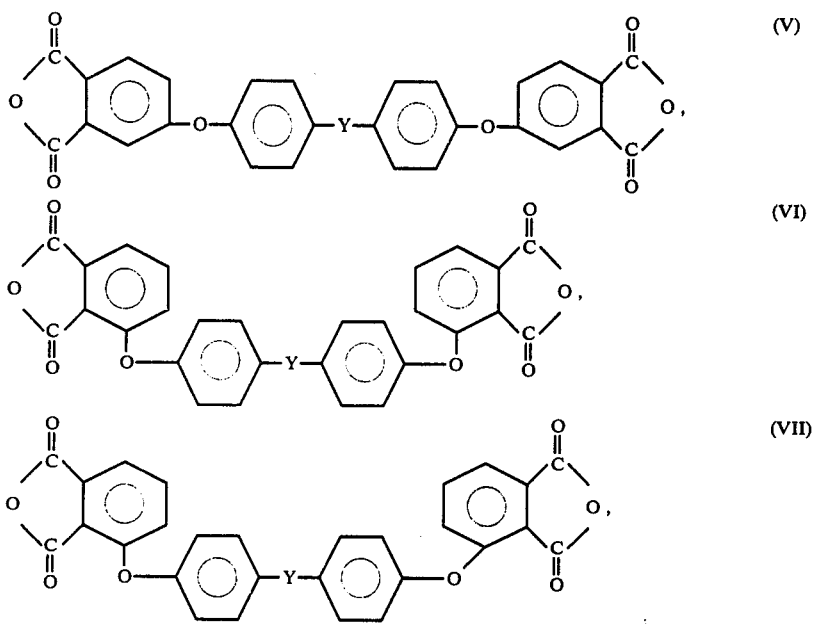

(V)

(VI)

(VII)

and mixtures thereof, where Y is selected from the class consisting of —O—, —S—,

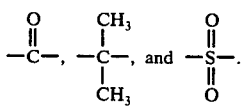

Aromatic bis(ether anhydride)s of formula V include, for example:
2,2-bis[4-(3,4-dicarboxyphenoxy)phenyl]propane dianhydride,
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula VI include, for example:
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride; and mixtures thereof.

The aromatic bis(ether anhydride) of formula VII may be, for example,
4-(2,3-dicarboxyphenoxy)-4'-(3,4-dicarboxyphenoxy)-diphenyl-2,2-propane dianhydride.

Some of the aromatic bis(ether anhydride)s of formula (1) are shown in U.S. Pat. No. 3,972,902 (Darrell Heath and Joseph Wirth). As described therein, the bis(ether anhydride)s can be prepared from the hydrolysis, followed by dehydration, of the reaction product of a nitro-substituted phenyl dinitrile with a metal salt of a dihydric phenol compound in the presence of a dipolar aprotic solvent.

Additional aromatic bis(ether anhydride)s also included by Formula I are shown by Koton, M. M., Florinski, F. S.; Bessonov, M. I.; Rudakov, A. P. (Institute of Heteroorganic Compounds, Academy of Sciences, U.S.S.R.), U.S.S.R. 257,010, November 11, 1969, Appl. May 3, 1967, and by M. M. Koton, F. S. Florinski, Zh. Org. Khin, 4 (5), 774 (1968).

The organic diamines of Formula II include, for example:
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzene,
1,3-diamino-4-isopropylbenzene,
1,2-bis(3-aminopropoxy)ethane,
benzidine
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine, 3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, and mixtures of such diamines.

The maximum imide content at which the polyetheramide-acid-imide polymer is soluble in the ether at 20° C. depends on the bis(ether anhydride) and diamine used in preparing the polymer and the particular ether employed. Solubility-imide content characteristics of a high molecular weight polymer prepared by reacting 2,2-bis[4-(3,4-dicarboxyphenoxy)phenyl]propane dianhydride (4-BPADA) with a substantially equimolar amount of 4,4′-methylenedianiline (MDA) show that this polymer has a maximum imide content of: less than 14 percent for solubility of 20° C. in ethylene glycol monoethyl ether and in diethylene glycol monoethyl ether and at least 24 percent but less than 34 percent for solubility at 20° C. in methyl cellosolve and in methyl carbitol. A similar polymer prepared by reacting 1.2 moles of MDA per mole of 4-BPADA has a maximum imide content of at least 83 percent for solubility at 20° C. in the following ethers: ethylene glycol monophenyl ether, diethylene glycol dimethyl ether, tetraethylene glycol dimethyl ether, tetrahydrofuran, and 1,4-dioxane. The maximum imide content for polymer solubility for other combinations of particular bis(ether anhydride)-diamine polymers and ethers can be readily determined by routine experimentation by persons of ordinary skill in the art.

The process of the present invention for preparing a polyetheramide-acid-imide solution is carried out by effecting reaction, preferably under anhydrous conditions, of at least one aromatic bis(ether anhydride) of formula I with at least one organic diamine of formula II in a liquid ether solvent which is substantially inert to the reactants.

In general, imide content of the polymer being formed increases with increasing reaction temperature and with longer reaction time, while imide content decreases with decreasing reaction temperature and with shorter reaction time. The reaction is usually effected at a temperature below 100° C., preferably below 60° C., and more preferably from about 20° C. to about 30° C., to form the polyetheramide-acid-imide polymer without imidization to such an extent that the polymer is insoluble in the ether at 20° C. In general, the polymer forming reaction is completed in from about 0.5 to about 20 hours.

The order of addition of the solvent and the bis(ether anhydride) and diamine reactants is not critical. The bis(ether anhydride) and the diamine reactants may be mixed and the resulting mixture added to the ether solvent, advantageously with stirring. If desired, the solvent may be added to a mixture of the bis(ether anhydride) and the diamine. In another suitable sequence, the diamine is dissolved in the solvent and the bis(ether anhydride) is added to the diamine solution with stirring.

In general, one mole of aromatic bis(ether anhydride) is added per mole of organic diamine to obtain high molecular weight polyetheramide-acid-imide solutions. However, up to 5 mole percent excess of either bis(ether anhydride) or diamine may be added to obtain solutions of suitably high molecular weight polyetheramide-acid-imide.

The amount of solvent used should be sufficient to produce a homogeneous solution of the polyetheramide-acid-imide and yet not be too viscous so as to introduce handling problems. In general, the solvent is present in an amount from about 60 to about 95 or more parts by weight per 100 parts by weight of the solution.

Practice of the present invention is further illustrated by the following non-limiting examples. All parts and percentages given throughout this description are by weight unless otherwise indicated. In the bend-and-crease flexibility test referred to in the examples, a cured resin film is folded over on itself through an angle of 180° and the fold is then creased by normal pressure from the fingers. Films which do not crack or break along the crease have good flexibility and pass the test.

EXAMPLE 1

To 287.44 parts of substantially anhydrous 2-(2-methoxyethoxy)ethanol ("methyl carbitol") were added with stirring 52.05 parts of 2,2-bis[4-(3,4-dicarboxyphenoxy)pehnyl]propane dianhydride (4-BPADA) and 19.82 parts of 4,4′-methylenedianiline (MDA). The mole ratio of 4-BPADA to MDA was 1:1. The 4-BPADA and MDA dissolved in the 2-(2-methoxyethoxy)ethanol. Stirring was continued at room temperature (about 20° to 25° C.) for about 2 hours, during which time a clear, viscous approximately 20 percent polyetheramide acid solution was formed. Based on method of preparation, the polyetheramide acid consisted essentially of recurring units of the following formula:

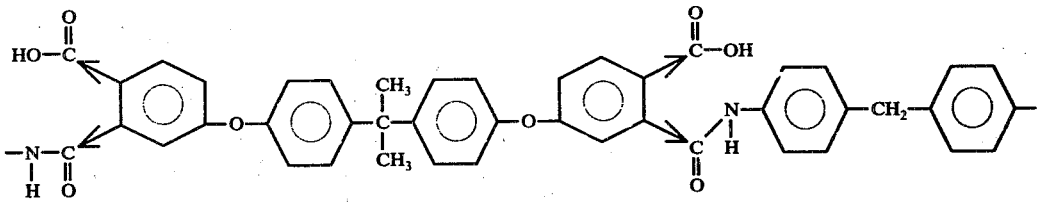

wherein the arrows indicate isomerism.

The solution was heated to 50° C., which temperature was maintained for one hour, and then cooled to room temperature (about 20° to 25° C.). Titration of a portion of the heat-treated solution (hereinafter referred to as Solution X) using the procedure described by Edith Boldebuck in U.S. Pat. No. 3,892,716, showed that about 9 percent of the amide-acid groups of the polyetheramide acid were now in the imidized form.

The 20 percent polymer solution (in both the initially prepared and 9 percent imidized forms) was judged to have a suitable viscosity for use in commercial wire enamel coating operations using coating dies. However, for greater ease in applying uniform coatings to wire by dipping, the partly imidized polymer solution was diluted to 10 percent polymer concentration by adding additional 2-methoxyethanol. Three straight aluminum wires (referred to as Wire A, Wire B, and Wire C), each 50.8 mils in diameter, were dipped into the 10 percent solution and removed at a rate of 5 feet per minute. The solution coated wires were cured for 5 minutes in an oven at 250° C. The coating and curing sequence was repeated twice. The cured polymer thickness of the thus coated wires was 0.8 mil. When coated Wire A was wound around a 1X mandrel, i.e. a mandrel having a diameter equal to the wire diameter, observation showed no evidence of cracks in the coating.

Coated Wire B was post baked for 30 minutes at 300° C. and coated Wire C was post baked for 15 minutes at 325° C. Observations showed no cracks in the coatings of the post baked wires when wound around a 1X mandrel.

Three more straight aluminum wires (referred to as Wire D, Wire E, and Wire F), each 50.8 mils in diameter, were each provided with a cured polymer coating, 1 mil in thickness, by repeating the above dipping-removing-curing procedure a sufficient number of times. After post baking for 15 minutes at 325° C. each of these coated wires was stretched 25 percent of its length. Coated Wire D was wound around a 1X mandrel; coated Wire E was wound around a 3X mandrel, i.e. a mandrel having a diameter equal to three times the wire diameter; and coated Wire F was wound around a 5X mandrel, i.e. a mandrel having a diameter equal to 5 times the wire diameter. Observations showed no cracks or crazing in the coatings of the wound wires D, E and F. After subsequently heating these previously wound wires for one hour at 250° C., observations again showed no cracks or crazing in the coatings.

EXAMPLE 2

3.753 grams of 2,2-bis[4-(3,4-dicarboxyphenoxy) phenyl]propane dianhydride (4-BPADA) and 1.50 grams of 4,4'-methylenedianiline (MDA) were added with stirring to 21 grams of technical grade methyl cellosolve, thereby forming a reaction mixture with the MDA dissolved in the methyl cellosolve. The reaction mixture was heated with continued stirring to 60° C. for about 1 hour, during which time a clear, moderately viscous, 20 percent solution of a polyether amide acid formed. The solution was cooled to room temperature (about 25° C.) and then diluted to 15 percent polymer concentration by adding a sufficient amount of methyl cellosolve.

Eight straight aluminum wires (referred to as Wires G, H, I, J, K, L, M and N) each 50.8 mils in diameter, were dipped into the 15 percent polymer solution. The wires were then removed and the thus-coated wires were baked for 5 minutes in an oven at 250° C. The coating and baking sequence was repeated three times, thereby providing 4 coats (total thickness of about 0.5 mil) of baked polymer on the wires. When Wire G was wound around a 1X mandrel, cracks resulted in the coating. When Wire H was wound around a 3X mandrel and Wire I was wound around a 5X mandrel, cracks resulted in the coatings of these wires.

Wires J, K, L, M and N were further baked by heating for 15 minutes in an oven at 325° C. Wire K was wound around a 1X mandrel; Wire L was wound around a 3X mandrel; and Wire M was wound around a 5X mandrel. No cracks were found in the coatings on these three wires.

Post-baked Wires M and N were crossed at a 90° angle in a cut-through apparatus commonly employed in evaluating enameled magnet wire J.A.N.-W-583 (7 Apr. 1948). The cut-through temperature was determined by placing the test apparatus in an air-circulating oven with the aluminum wires connected to a 110-volt A.C. circuit containing an alarm system. A one kilogram load was placed on the crossed-wire pair. The temperature of the oven was increased at a rate of about 10° C. per minute. The cut-through temperature was found to be 320° C., the temperature at which the crossed wires short circuited, i.e. electrical contact was made between the two wires through the coatings, as indicated by activation of the alarm.

EXAMPLE 3

To an Erlenmeyer flask equipped with a magnetic stirring bar were added 0.451 gram (0.00204 mole) of 4,4'-oxydianiline (ODA) and 13.4 grams of 2-(2-methoxyethoxy)ethanol, i.e., methyl carbitol. The mixture was stirred to dissolve the ODA and a total of 1.041 grams (0.002 mole) of 2,2-bis[4-(3,4-dicarboxyphenoxy)phenyl] propane dianhydride (4-BPADA) was added to the ODA solution in portions with stirring over a period of 30 minutes while maintaining the reaction mixture at room temperature (about 25° C.). Stirring was continued for about 2 hours, during which time a clear approximately 10 percent solution of a polyether amide acid was formed. Based on method of preparation, the polyether amide acid consisted essentially of recurring units of the following formula:

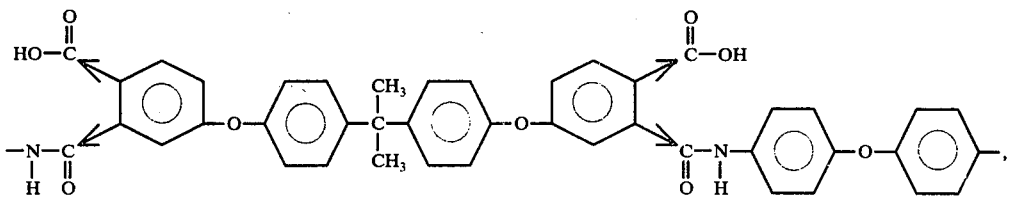

wherein the arrows indicate isomerism.

The polymer solution was moderately viscous and was judged suitable for use as a wire coating enamel. One gram of the solution was poured into a 2-inch diameter aluminum cup and heated for 5 minutes at each of the following temperatures in the order given: 100° C., 125° C., 150° C., 200° C., and 250° C., followed by heating for 10 minutes at 300° C. The resulting cured polymer film, 0.7 mil in thickness, passed the bend-and-crease flexibility test described above.

EXAMPLE 4

To an Erlenmeyer flask equipped with a magnetic stirring bar were added with stirring 1.041 grams (0.002 mole) of 2,2-bis[4-(3,4-dicarboxyphenoxy)phenyl]propane dianhydride (4-BPADA), 0.22 gram (0.00204 mole) of m-phenylenediamine (MPD), and 11.35 grams of 2-(2-methoxyethoxy)ethanol (i.e., methyl carbitol). The reaction mixture was stirred at room temperature (about 23° C.) for about 2 hours, during which time a clear approximately 10 percent solution of a polyether amide acid was formed. Based on method of preparation, the polyether amide acid consisted essentially of recurring units of the formula:

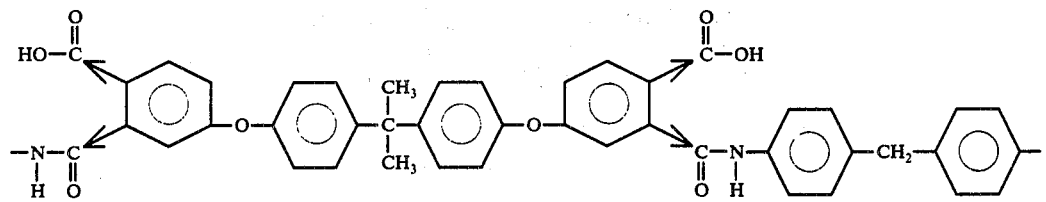

wherein the arrows indicate isomerism. One gram of the solution was poured into an aluminum cup and heated for 5 minutes at each of the following temperatures in the order given: 100° C., 125° C., 150° C., 200° C., and 250° C., followed by heating at 300° C. for 10 minutes. The resulting cured polymer film passed the bend-and-crease flexibility test described above.

EXAMPLE 5

To an Erlenmeyer flask equipped with a magnetic stirring bar were added with stirring 1.041 grams (0.002 mole) of 2,2-bis[4-(3,4-dicarboxyphenoxy)phenyl]propane dianhydride (4-BPADA), 0.396 gram (0.002 mole) of 4,4'-methylenedianiline (MDA), and 12.9 grams of 2-methoxyethanol (i.e., methyl cellosolve). The reaction mixture was stirred at room temperature (about 23° C.) for about 2 hours, during which time a clear approximately 10 percent solution of a polyether-amide acid was formed. Based on method of preparation, the polyether amide acid consisted essentially of recurring units of the formula:

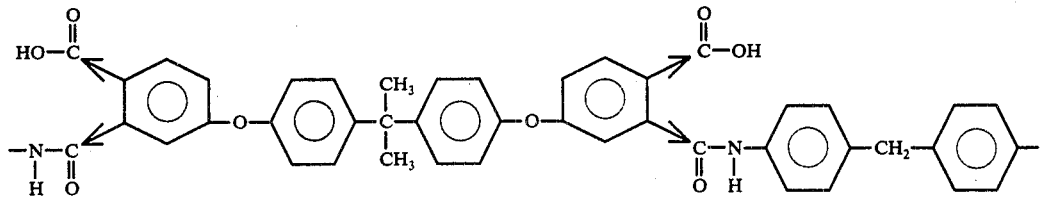

wherein the arrows indicate isomerism.

EXAMPLE 6

To an Erlenmeyer flask equipped with a magnetic stirring bar were added with stirring 1.041 grams (0.002 mole) of 2,2-bis[4-(3,4-dicarboxyphenoxy)phenyl]propane dianhydride (4-BPADA), 0.396 gram (0.002 mole) of 4,4'-methylenedianiline (MDA), and 12.9 grams of 2-butoxyethanol (i.e., butyl cellosolve). The reaction mixture was stirred at room temperature (about 23° C.) for about 2 hours, during which time a clear approximately 10 percent solution of a polyether-amide acid was formed. Based on method of preparation, the polyether amide acid consisted essentially of recurring units of the formula:

wherein the arrows indicate isomerism.

EXAMPLE 7

Example 5 was repeated except that 12.9 grams of

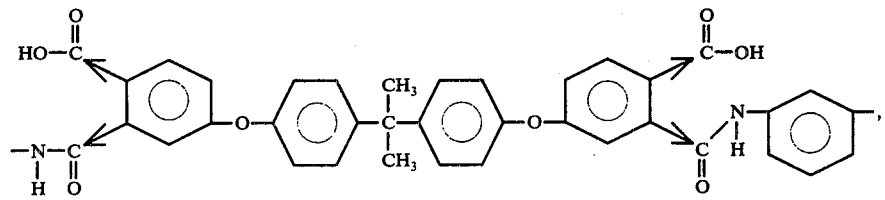

ethylene glycol dimethyl ether (1,2-dimethoxyethane) was substituted for the 12.9 grams of 2-methoxyethanol. The resulting polyether amide acid was insoluble in the ethylene glycol dimethyl ether.

EXAMPLE 8

Example 5 was repeated except that 12.9 grams of diethylene glycol diethyl ether was substituted for the 12.9 grams of 2-methoxyethanol. The resulting polyether amide acid was insoluble in the diethylene glycol diethyl ether.

EXAMPLE 9

8.32 grams (0.016 mole) of 2,2-bis[4-(3,4-dicarboxyphenoxy)phenyl]propane dianhydride (4-BPADA) and 3.25 grams (0.0164 mole) of 4,4'-methylenedianiline (MDA) were added to a 100-milliliter three-necked round bottom flask equipped with a condenser, stirrer and thermometer. 34.71 grams of dried and distilled methyl cellosolve (boiling range of 123.5° to 125.0° C.) was added to the MDA and 4-BPADA. The resulting reaction mixture was stirred at a temperature of 25° C. for 48 hours. There was obtained a clear approximately 25 percent polyether amide acid solution (referred to hereinafter as Solution A) wherein the polyether amide acid was partially imidized as determined by titration of a portion of the solution. Based on method of preparation and the titration, the polyether amide acid consisted essentially of recurring units of the formula shown in Example 1 except that 4 percent of the amide acid groups having the formula

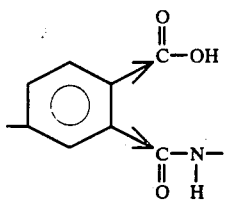

were in the imide form having the formula

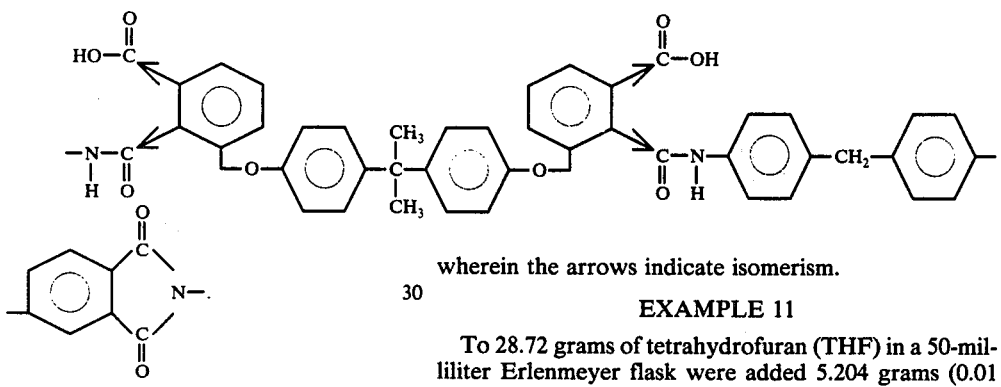

The viscosity of Solution A was 6450 centistokes at 25° C. as measured using a Cannon Manning viscometer within three hours after the solution was prepared.

A portion of Solution A was heated with stirring at 60° C. for 4 hours. A portion of the resulting solution (Solution B) was titrated and the polyether amide acid was found to be 12 percent imidized. Tests showed that Solution B contained 26.5 percent total solids and had a viscosity at 25° C. of 1700 centistokes as measured within three hours after the solution was prepared.

A portion of Solution B was further heated with stirring at 78° C. for 1 hour. A portion of the resulting solution (Solution C) was titrated and the polyether amide acid was found to be 20 percent imidized. Tests showed that Solution C contained 26.5 percent total solids and had a viscosity at 25° C. of 517 centistokes as measured within three hours after the solution was prepared.

A portion of Solution C was further heated with stirring at 100° C. for 1 hour. The resulting 44 percent imidized polyether amide acid precipitated from the solution.

Other portions of Solution A, Solution B and Solution C were cast on aluminum foil. The castings were cured in an oven for 5 minutes at 100° C., 5 minutes at 250° C. and 20 minutes at 300° C. The resulting films, each 2 mils in thickness, were tough and flexible. The films passed the bend-and-crease test.

Still other portions of Solution A, Solution B and Solution C were stored at room temperature and tested periodically for viscosity at 25° C. The viscosity of Solution A slowly decreased and then stabilized at 2500 centistokes after one month. The viscosity of Solution B decreased and then stabilized at about 1500 centistokes after one week. The viscosity of Solution C increased slowly and stabilized at 750 centistokes after 1 week.

EXAMPLE 10

5.204 grams (0.01 mole) of 2,2-bis[4-(2,3-dicarboxyphenoxy)phenyl]propane dianhydride (3-BPADA) was added to an Erlenmeyer flask containing 31.71 grams of methyl carbitol. A solution of 1.98 grams (0.01 mole) of 4,4'-methylenedianiline (MDA) in 9.00 grams of methyl carbitol was added with stirring for about one minute, resulting in formation of a clear yellow reaction mixture. Stirring was continued at room temperature (about 25° C.) for 2 hours, during which time a clear approximately 15 percent polyether amide acid solution was formed. Based on method of preparation, the polyether amide acid consisted essentially of recurring units of the formula wherein the arrows indicate isomerism.

EXAMPLE 11

To 28.72 grams of tetrahydrofuran (THF) in a 50-milliliter Erlenmeyer flask were added 5.204 grams (0.01 mole) of 2,2-bis[4-(3,4-dicarboxyphenoxy)phenyl] propane dianhydride (4-BPADA) and 1.98 grams (0.01 mole) of 4,4'-methylenedianiline (MDA). After stirring for 5 minutes at room temperature (about 25° C.), a clear approximately 20 percent polyether amide acid solution was obtained. Stirring was continued at about 25° C. for about 2 hours, during which time the viscosity of the solution increased (evidencing molecular weight increase of the polymer). This solution is hereinafter referred to as Solution Y.

A portion of the solution was cast on aluminum foil and heated for one hour at each of the following temperatures: 50° C., 125° C., 200° C., and 250° C., followed by heating for 30 minutes at 300° C. and 10 minutes at 325° C. The resulting 2-mil cured film was tough and flexible. When peeled from the foil, the film passed the bend-and-crease test. The cured film had a cut-through temperature of 320° C. as determined with the film placed between two crossed bare copper wires of 50.8 mil diameter.

EXAMPLE 12

To 28.72 grams of N-methyl pyrrolidone (NMP) in a 50-milliliter Erlenmeyer flask were added 5.204 grams (0.01 mole) of 2,2-bis[4-(3,4-dicarboxyphenoxy)phenyl] propane dianhydride (4-BPADA) and 1.98 grams (0.01 mole) of 4,4'-methylenedianiline (MDA). After stirring for one hour at room temperature (about 25° C.) a clear, viscous, approximately 20 percent polyether amide acid solution was obtained. This solution is hereinafter referred to as Solution Z.

There were cast on aluminum substrates 4 one-gram samples of each of Solution X (Example 1), Solution Y (Example 11) and Solution Z. The imidization rates of these polymer solutions were compared in tests at 80°

C., 100° C., 120° C., and 150° C. by heating one sample of each casting at each of the indicated cure temperatures for 7 hours. Percent imidization for each film was determined by dissolving the film in pyridine and titrating the resulting solution. The results are shown in Table I below.

TABLE I

PERCENT IMIDIZATION OF POLYETHERAMIDE ACID SYNTHESIZED FROM 4-BPADA AND MDA IN DIFFERENT SOLVENTS

| Solution | Solvent | Cure Temperature | | | |
| --- | --- | --- | --- | --- | --- |
| | | 80° C. | 100° C. | 120° C. | 150° C. |
| X[(1)] | methyl carbitol | 58% | 81% | 94% | 97% |
| Y | THF[(2)] | 32% | 56% | 95% | 99% |
| Z | NMP[(3)] | 32% | 40% | 85% | 96% |

[(1)]Polymer in the initial solution was 9% imidized
[(2)]Tetrahydrofuran
[(3)]N-methyl pyrrolidone The data shows that imidization is substantially faster for the 4-BPADA-MDA reaction product in both tetrahydrofuran and methyl carbitol relative to the rate of imidization in N-methyl-pyrrolidone.

It is understood that the foregoing detailed description is given merely by way of illustration and that many modifications may be made therein without departing from the spirit or scope of the present invention.

What is claimed is:

1. A polyether amide-acid-imide solution consisting essentially of
   (1) as a liquid solvent, 2-(2-methoxyethoxy)ethanol, and dissolved in said liquid solvent
   (2) a polyetheramide-acid-imide having an imide content no greater than the maximum imide content at which the polyetheramide-acid-imide is soluble in the solvent at 20° C. and prepared by reacting
      (i) at least one aromatic bis(ether anhydride) having the formula

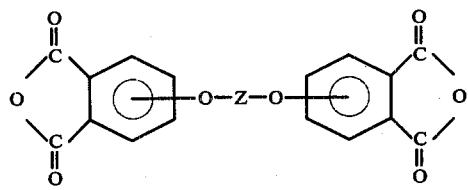

with
      (ii) at least one organic diamine having the formula

N₂N—R—NH₂ at a temperature and for a time effective to form said polyetheramide-acid-imide, where Z is a member selected from the class consisting of (A) divalent organic radicals having the following formulas

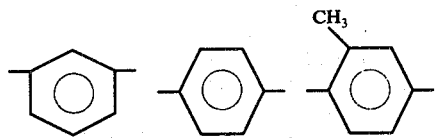

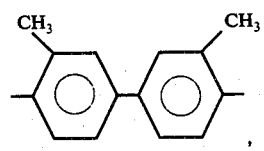

-continued

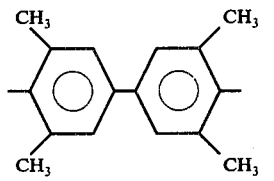

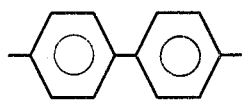

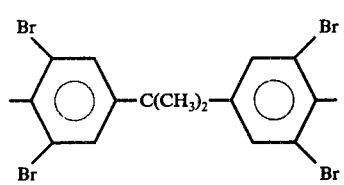

and (B) divalent organic radicals of the general formula

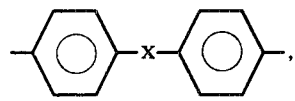

where X is a member selected from the class consisting of divalent radicals of the formulas

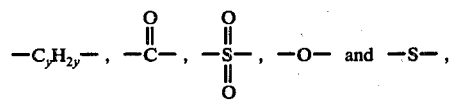

where $y$ is an integer from 1 to 5; and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane, and divalent radicals of the general formula

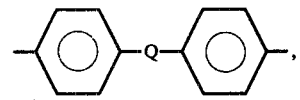

where Q is a member selected from the class consisting of

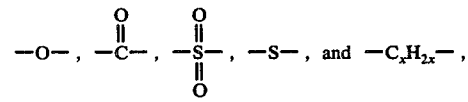

and x is an integer from 1 to 5.

2. The solution of claim 1, where the aromatic bis(ether anhydride) is 2,2-bis[4-(3,4-dicarboxyphenoxy)phenyl]propane dianhydride and the organic diamine is 4,4'-methylenedianiline.

3. A process for preparing a polyetheramide-acid-imide solution, comprising reacting at least one aromatic bis (ether anhydride) having the formula

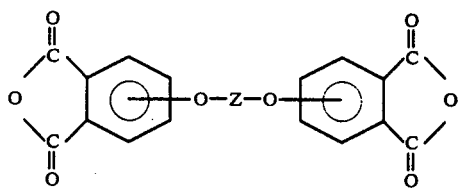

with at least one organic diamine having the formula

H₂N—R—NH₂ in 2-(2-methoxyethoxy)ethanol having at least one of said bis(ether anhydride) and said diamine dissolved therein at a temperature and for a time effective to form a solution in the 2-(2-methoxyethoxy)ethanol of a polyetheramide-acid-imide having an imide content no greater than the maximum imide content at which the polyetheramide-acid-imide is soluble therein at 20° C., where Z is a member selected from the class consisting of (A) divalent organic radicals having the following formulas

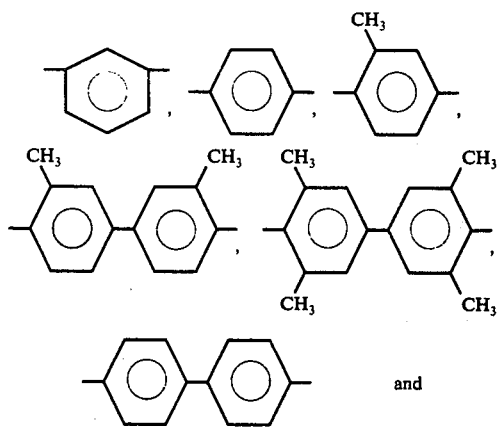

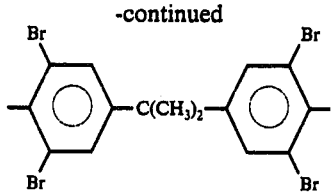

and (b) divalent organic radicals of the general formula

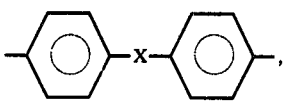

where X is a member selected from the class consisting of divalent radicals of the formulas

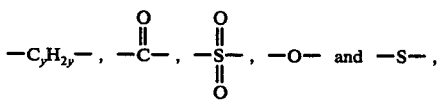

where $y$ is an integer from 1 to 5; and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula

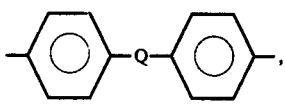

where Q is a member selected from the class consisting of

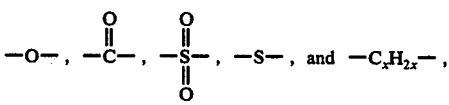

and $x$ is an integer from 1 to 5.

* * * * *